Aug. 1, 1944.  H. L. ROBERTS  2,354,833
HOSE CLAMP
Filed May 8, 1943
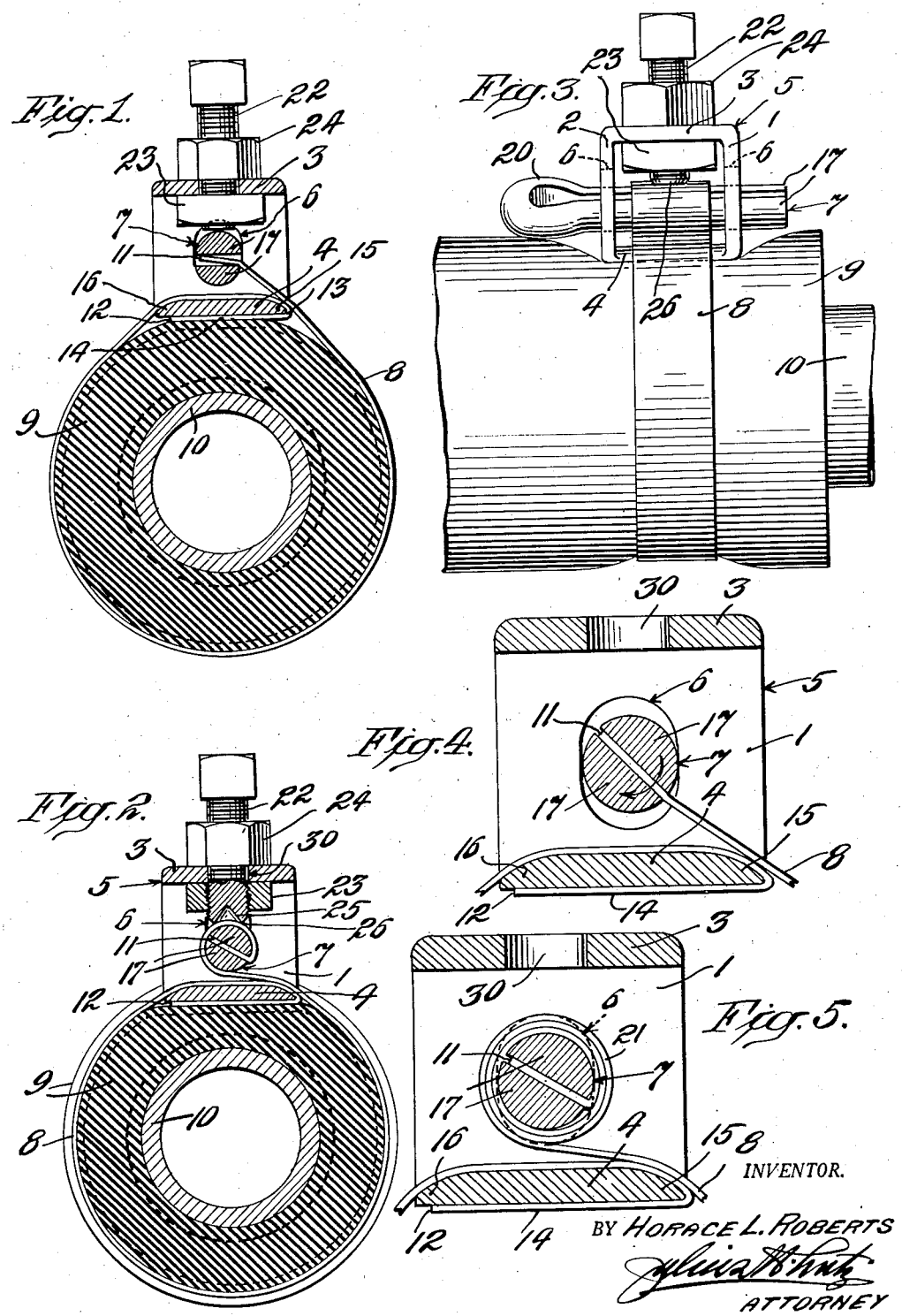
INVENTOR.
BY HORACE L. ROBERTS
ATTORNEY Patented Aug. 1, 1944

2,354,833

UNITED STATES PATENT OFFICE 2,354,833

HOSE CLAMP

Horace L. Roberts, Mount Vernon, N. Y.

Application May 8, 1943, Serial No. 486,121

5 Claims. (Cl. 24—19)

This invention relates to hose clamps, and particularly to those adapted for applying clamping pressure around a rubber hose, such as the thick-walled type at present in use as gas line connections on airplanes and other automotive vehicles.

One of the objects of the present invention is to provide a device of this character adapted to tighten or constrict a flexible metal band around the hose with a positive, uniform tightening action, and which shall be provided with means by which the degree of tightening force may be governed and consistently maintained.

The invention contemplates the provision of a positive locking means enabling the adjustment of the clamping band to be not only easily attained but maintained indefinitely during all conditions of use.

Another object of the invention is to provide a clamp of the character described wherein the encircling band presents a smooth and uninterrupted surface against the hose which it embraces.

These and other objects are secured by the structure hereinafter described and more particularly pointed out in the claims appended hereto.

Reference is to be had to the accompanying drawing, forming a part hereof, in which Fig. 1 is a vertical sectional view through the clamp as applied to a relatively thick hose but not yet tightened around the same; Fig. 2 is a similar view showing the clamp adjusted or tightened about the hose; Fig. 3 is a side elevation of the clamp in position around the hose; Fig. 4 is a vertical sectional view through the head of the clamp, and Fig. 5 is a similar view, showing a portion of the band wound up on the split pin.

The head or clamping member of the device, is shown at 5 and the same consists of a relatively square, box-like tube provided with the integral side walls 1 and 2, top wall 3 and bottom wall 4. The side walls 1 and 2 are each provided with an elongated aperture 6, said apertures being located in transverse alignment so that a cotter or split pin 7 can pass through them and be rotative therein, as will be hereafter pointed out.

The hose-clamping band or encircling member 8, which embraces and tightly clamps the hose 9, usually holding it in connected relation with a metal pipe or tube 10, is provided with the two ends 11 and 12. The end 12 of the band 8 is folded back upon itself, as indicated at 13, so that it will extend about the bottom wall 4 of the head and have a part 14 confined between the lower surface of the bottom wall and the periphery of the hose. It will be noted that the ends 15 and 16 of the bottom wall 4 are rounded or tapered so that the band may be drawn smoothly over them.

End 11 of the band extends between the legs 17 of the cotter pin 7, and is firmly gripped between the same, so that by rotation of the cotter pin, the end portion of the band will be wound up around the cotter pin, as shown in Figs. 2 and 5, to the required extent to constrict the band tightly around the hose. In this connection, attention is directed to the fact that the apertures 6 are elongated, and that each of the apertures at its narrowest part, is only very slightly wider than the diameter of the body of the cotter pin. Thus, when the legs of the cotter pin are spread apart for the insertion of the end 11 of the band 8, such spreading action may take place while the split in the pin is disposed horizontally, or as disclosed in Fig. 1.

After the end 11 of the band is inserted between the legs 17 of the pin 7, and the pin is rotated by engagement of a suitable tool with the looped head 20 of the pin, the rotation of the pin within the apertures 6 will result in the legs being tightly compressed by the side walls of the apertures, so that in this initial turning movement of the split pin within the apertures, the end 11 of the band will be very tightly gripped by the pin and will not slip while being wound up around the pin in the manner shown in Figs. 2 and 5. The elongation of the apertures 6 not only enables one end of the band to be firmly gripped by the legs of the pin in the manner explained, but also enables the pin to rise upwardly in the apertures should it become necessary to wind a considerable portion of the band 8 around the pin, as indicated at 21 in Fig. 5. The rising up of the pin in the elongated apertures 6 will provide sufficient clearance between the pin and the bottom wall 4 to enable a number of turns of the band to be taken around the pin.

Once the band has been tightened to the required extent around the hose 8, and it can be tightened to indent itself well into the hose as clearly seen in Figs. 2 and 3, the adjustment is maintained by means of a locking screw 22 passing through the hole 30 in the top 3 of the head 5, and threaded through the square nut 23 confined between the side walls 1 and 2 of the head 5. A lock nut 24 engages the screw 22 on the outer side of the top wall 3 of the head. The inner end of the locking screw is operative against the portion of the band that is wound around the split pin 7, and to firmly engage the band, the end of the locking screw is provided with a depression or cup 25 resulting in a sharp annular edge 26 which tends to "bite" into the band and thereby prevent rotative slippage of the band and turning of the split pin.

It will be apparent from the foregoing that the operation of the device is simple and positive. By rotation of the cotter pin 7, the end 11 of the band will be wound around the pin 7 to the required extent to enable the band to be very tightly constricted around the hose or other cylindrical object which it embraces. As the pin is rotated, the side edges of the apertures 6 will automatically force the legs 17 of the pin toward one another and hold the band firmly gripped between them. When the band has been tightened to the required extent, the locking screw 22 is tightened down and its cupped end 25, presenting the sharp edge 26 about its central depression, will grippingly engage the part of the band extending around the pin 7 and prevent slippage. The entire band presents an inner face completely free from rivets, welding or other projections, thus resulting in an equal distribution of clamping pressure throughout its area of embracement of the hose.

While I have shown an embodiment of the invention, it is obvious that the same is not to be restricted thereto, but is broad enough to cover all structures coming within the scope of the annexed claims.

What I claim is:

1. A hose clamp comprising, a flexible metal band adapted to embrace a hose, a head with which one end of the band is engaged, said head having spaced walls, each of said walls having an aperture, a split pin extending through said apertures, the second end of the band extending into the split in the pin, whereby a portion of the band adjacent to said end will be wound about the pin when the pin is rotated in the apertures, and a locking screw operative through the head against the portion of the band that is wound about the split pin to maintain the position of the same.

2. A hose clamp comprising, a head provided with a top, a bottom, and side walls, the side walls each having an elongated aperture, a split pin extending through said apertures and capable of rotative and elevating movement therein, a flexible metal hose-embracing band having one end extended about the bottom and having a part confined between said bottom and the clamped hose, the other end of the band being confined between the sections of the split pin, a portion of the band adjacent to the last-mentioned end being adapted to be wound around the pin by rotative movement of the pin in the apertures, and a locking screw operative through the top and having its end in engagement with the portion of the band that is wound about the split pin, and a lock-nut for maintaining the adjusted position of the locking screw.

3. A hose clamp comprising, a flexible metal hose-embracing band, a substantially square, box-like head provided with parallel sides, a top and a bottom, one end of the band extending around the bottom and having a part confined between said bottom and the clamped hose, the sides of the head each having an elongated aperture, a split pin extending through said apertures, the second end of the band being confined in the split in the pin and being adapted to be clamped by the legs of the pin upon which clamping pressure is exerted by the walls of the apertures when the pin is rotated in said apertures, said apertures permitting the pin to be bodily moved away from the bottom of the head when a number of turns of the band has been wound around the split pin, and a locking screw operative through the top of the head against the part of the band that is extended around the split pin.

4. A hose clamp comprising, a flexible metal band adapted to embrace a hose, a head with which one end of the band is engaged, said head having spaced walls, each of said walls being provided with an aperture, a split pin extending through said apertures, the second end of the band extending into the split in the pin, whereby a portion of the band adjacent to said end will be wound about the pin when the pin is rotated in the apertures, and a locking screw operative through the head against a portion of the band that is wound about the split pin to maintain the position of the band, said locking screw having a cupped end providing a sharp edge for biting engagement with the part of the band with which it contacts.

5. A hose clamp comprising, a flexible metal band adapted to embrace a hose, a hollow head having a part around which one end of the band is extended, the head having spaced apertures, a split pin rotative in the apertures and engaged with the second end of the band within the head, and a locking screw adjustable through the head and having an end in engagement with the end of the band that is engaged by the split pin.

HORACE L. ROBERTS.